DATA CARD TRANSMITTER WITH CARD CONTROLLED GATING MEANS

Filed March 28, 1966 3 Sheets-Sheet 1

INVENTOR:
NEWTON L. FELD
BY [signature]
ATTORNEY.

DATA CARD TRANSMITTER WITH CARD CONTROLLED GATING MEANS

Filed March 28, 1966 3 Sheets-Sheet 2

INVENTOR:
NEWTON L. FELD
BY Robert H. Henderson
ATTORNEY.

March 31, 1970 N. L. FELD 3,504,186

DATA CARD TRANSMITTER WITH CARD CONTROLLED GATING MEANS

Filed March 28, 1966 3 Sheets-Sheet 3

INVENTOR:
NEWTON L. FELD
BY Robert H. Henderson
ATTORNEY.

3,504,186
DATA CARD TRANSMITTER WITH CARD CONTROLLED GATING MEANS

Newton L. Feld, New York, N.Y., assignor to The Western Union Telegraph Company, New York, N.Y., a corporation of New York Filed Mar. 28, 1966, Ser. No. 538,008
Int. Cl. G01n *21/30;* G01d *5/36*
U.S. Cl. 250—219 14 Claims

ABSTRACT OF THE DISCLOSURE

A card reader for a stack of punched or sense-marked data cards, or for such cards intermixed, or for cards having both punch marks and sense marks therein, all read by means utilizing reading probe pulses at accurate card travel distances, and adapted for various card lengths.

This invention relates to a data card transmitter and more particularly to a device which feeds such cards from a stack serially past a given point, and comprises primarily the mechanical portion of such a transmitter.

It is an object of this invention to provide a device which can feed, serially, cards from a stack past a sensing position.

It is another object of this invention to provide a device which will cease operation after the last card of the stack of cards has been fed past a sensing position.

It is an additional object of this invention to provide a device which detects the presence and absence of a card at a sensing position.

Another object of the invention is to provide a data card transmitter of simplified structure for operation with either punched cards or mark-sense cards.

Still another object is to provide such a transmitter for transmission of all the information contained in both punchings and sense markings on single cards.

Another object is to provide such a transmitter for automatic transmission from mixed cards of the above descriptions.

It is a further object of this invention to provide a device which is reliable in operation and economical to build.

Other objects and many of the attendant advantages of this invention will be readily appreciated as the apparatus becomes better understood by reference to the following detailed description when considered in connection with the accompanying drawings wherein.

Similar reference characters refer to similar parts throughout the several views of the drawings.

Figure 1:
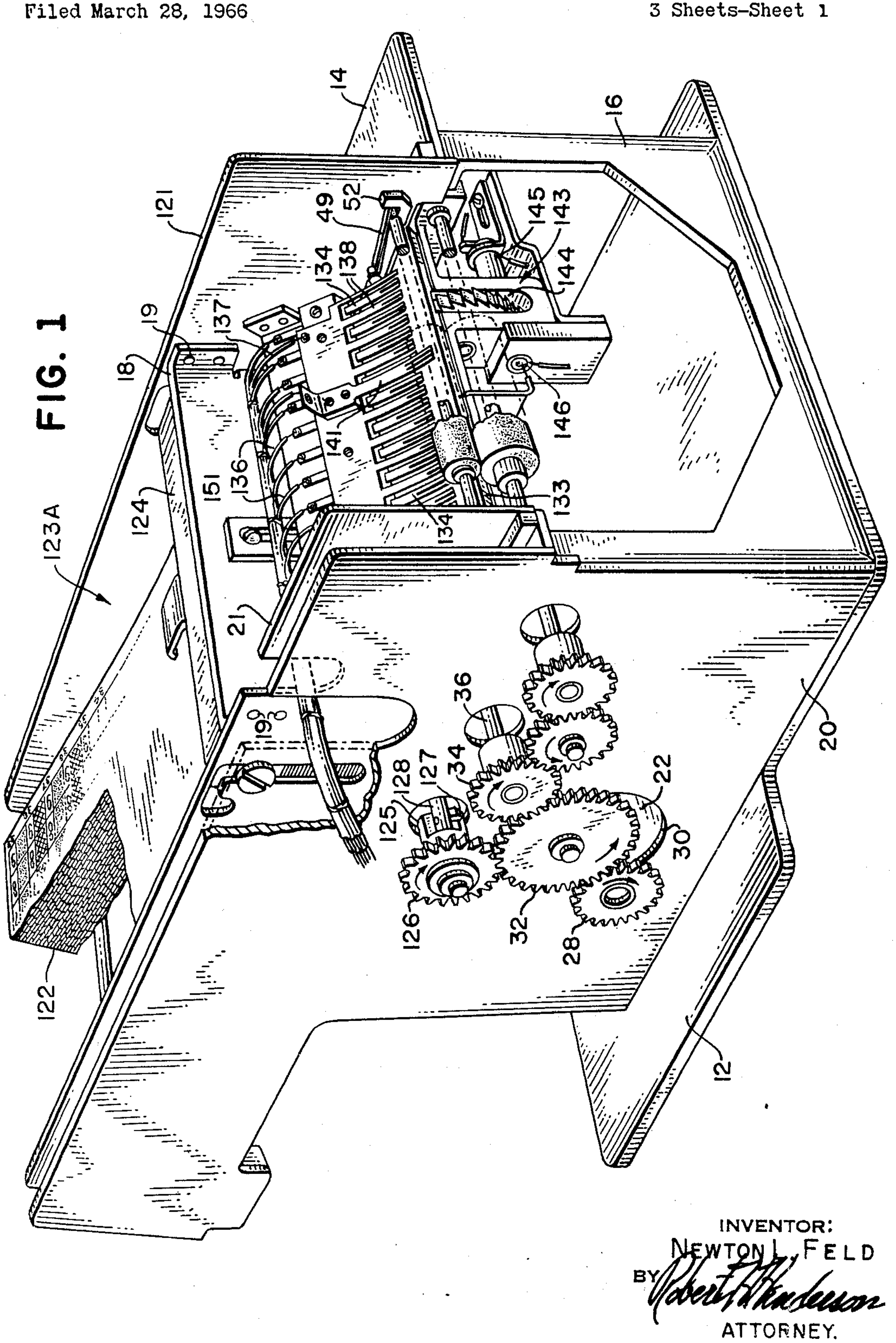
FIG. 1 is an isometric view of structure in accordance with the principles of this invention.

Briefly, in this invention, a stack of business machine cards are placed in a hopper which contains a pressure sensitive means to indicate the presence or absence of cards and a selectively activated drive means positioned to intermittently urge the lowermost card of the stack out of the hopper. A feed means for driving the card emerging from the hopper then seizes the card and forwards it continuously past electrical sensing brushes of unique structure for reliable readout of either marks or holes as may occur. During such continuous forwarding of each card, a card driven odometric device driven by frictional contact with the card, but compensated to eliminate the effects of frictional slip, provides gating or probe signals for unblinding the associated logic circuitry at each correct instant for intelligence sensing, in order to provide improved reliability of reading. At the same time, leading and following brushes which traverse unmarked portions of the card, monitor the appropriateness of transmitting at all, and the existence of a proper gap between cards (as opposed to an overlapping) which is caused by the said continuous advancement of cards intermittently withdrawn.

The unique structure of the sensing brushes above referred to comprises their formation from a single blank of resilient stock in each of several closely spaced planes, so that as many as six separate sensing fingers are operative simultaneously in reading each card hole or mark. This is made feasible by the lateral stability imparted to the fingers because of their construction by slitting in situ each of the several layers of thin and resilient sheet stock, and the unique method of shaping their ends. later to be described.

The invention is arranged to provide against transmission from overlapping cards, and to ingeniously overcome the adverse effects of the lint commonly found in card reading machines to be a source of erratic signals. By reason of the novel structure employed for these purposes, it is also capable of transmitting without adjustment, from cards of abbreviated length when such are used for the purposes of economy, as well as from cards which are longer than the standard 80 column Hollerith format.

The odometric control means driven by the cards emerging from the hopper causes interruptions of a light beam impinging on a photocell, so that photocell output signals corresponding in time to the optimum instant for reading each card marking area are produced. Appropriate detent means are provided in order to insure that the control means is properly indexed at the beginning of each card, and special sensing fingers are provided to insure that the desired separation between the moving cards is actually maintained. Braking means are applied to the drive motor such that the progress of any card can be stopped practically instantaneously upon the detection of malfunction by the aforesaid special sensing fingers or upon their detection of an alpha character following a numeric character, or vice versa. This allows time for the generation and transmission of the necessary "letters" or "figures" function signal in the Baudot code, and also may be used to enable the insertion of variable data when desired.

With reference to the figures, there are shown isometric views of a specific structure arranged in accordance with the principles of this invention and illustrating in detail the drive trains, the intermittent drive means, the card feed detecting means, the card hole and mark sensing means, and the card indexing and probe pulse forming device.

A bottom member 12 composed of sheet steel, aluminum or the like is positioned parallel with and secured rigidly to a top member 14 also composed of sheet steel, aluminum or the like by means of spacer 16. A side wall or plate 20, also composed of sheet material such as steel, aluminum, plastic or the like forms a side member secured to the bottom member 12 by means of spacers such as 16 and plates 21 and 121 are fastened to plate 14 to guide the cards and are bridged by bracket 18 which is secured by means of suitable fastenings such as 19, to constitute a card bin 123A.

Card feed mechanism

A fractional horsepower electric motor 22 having a reduction gear drive forms a unit which is secured to the side plate 20. A drive gear 28 which is supported by and locked to the output shaft of the reduction gear drive in the usual way extends through a cutout 30 in the side plate 20 for engagement with an idler gear 32. A gear 34 driven by idler gear 32 is coupled securely to a shaft 36 by means of a set screw or the like, the shaft being supported rotatably by bearing members. A drive wheel 38 composed of rubber or knurled steel or plastic or the like is secured rigidly to and driven by the shaft 36. The drive wheel 38 is positioned to engage an idler roller 42 which is rotatably supported by a shaft 44 resiliently secured at one end 46 by a cantilever member 48; and is similarly supported at the other end by a member 49. Shaft 44 is thus urged downward by springs 48 and 49 which press the shaft 44 at the ends 46 and 50 to drive the idler roller 42 into the drive wheel 38. The support members 60 and 52 are secured rigidly to the plates 21 and 121 by means of suitable fastenings.

The drive roller 38 and idler roller 42 thus serve by their rotation to advance uniformly and continuously any data card whose leading edge is inserted between them. They constitute the portion of the card feed mechanism which drives the cards under the stylus assembly where the reading of the card takes place.

Figure 2:
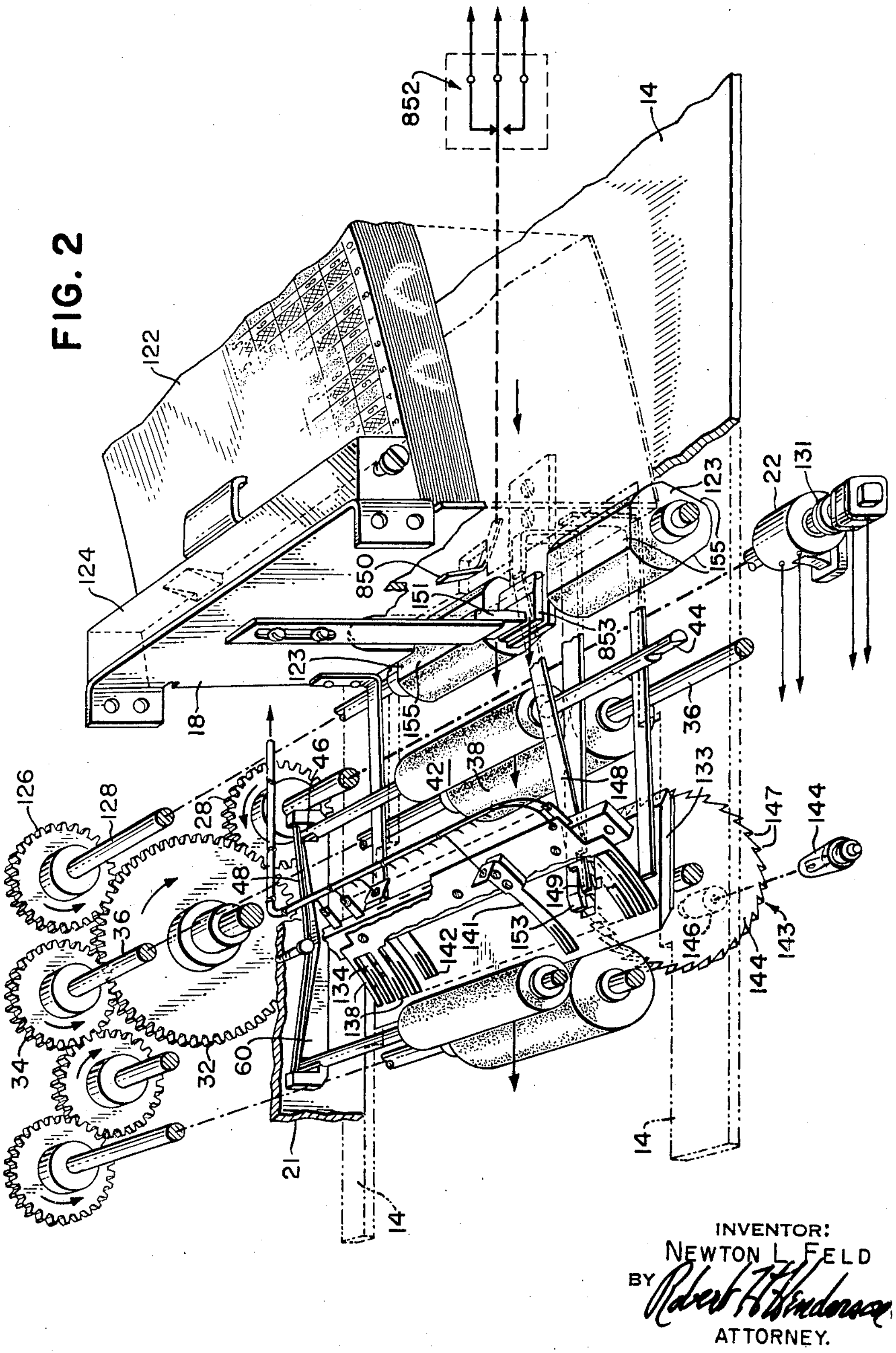
FIG. 2 is an electrical and mechanical diagrammatical view of structure in accordance with the principles of this invention.

At the start of the reader operation, a stack of up to 150 cards 122 is placed in the card bin 123A. As can be seen in FIG. 2, in this position the leading edge of the bottom card rests on the feed roller 123. The weight of the stack plus hold down plate 124 urges the bar member 850 downward to operate switch 852 which indicates the presence of cards in the hopper.

Now, electrical energy is fed to the motor and the device begins to operate. The motor shaft transmits power through the gears and under impetus of the card weight 124 the rotation of the feed roller 123 advances a card under the card gauge 151 and between the drive and pressure rollers 38 and 42. As each card leaves the card bin, the one above it drops down to take its place. The card gauge is designed to allow the feeding of only one card at a time.

A ¾″ gap is provided between each card to allow for the automatic transmission of carriage return and line feed characters. This gap is provided as seen in FIG. 2 by equipping the feed roller with a plurality of flats 155.

These flats are sufficient in radial depth to prevent engagement of the feed roller with the card during passage of the flat therebeneath because of the fact that the cards are then supported above the feed roller by the bottom gage 853. The cards are each thereby given the desired intermittent forward motion whereby the revolution of the drive roller 38, upon its engagement therewith causes the desired spacing apart of the cards.

Figures 3, 5:
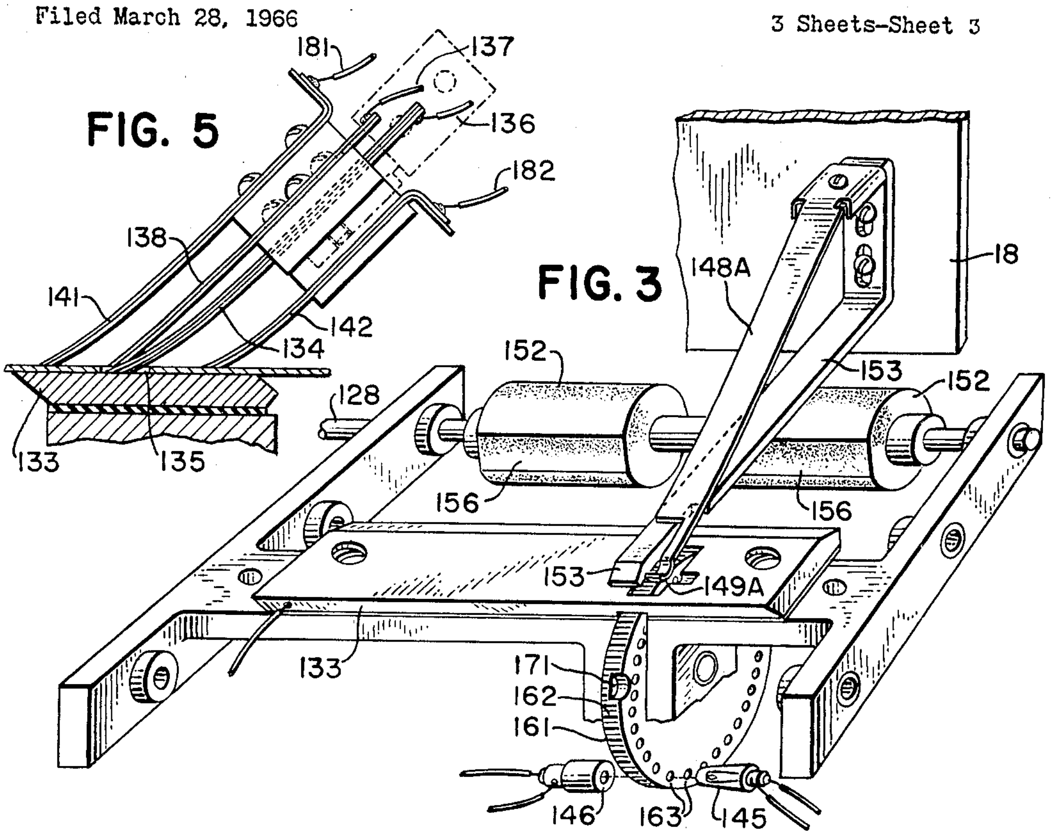
FIG. 3 is an isometric view of an alternative manner of coonstructing a portion of FIG. 2.
FIG. 5 is a section on the line 5—5 of FIG. 4.

An alternative means of providing the intermittent card feed is that shown in FIGS. 1 and 3, wherein a pair of feed rollers 152 are provided with single flats 156, which are not, however, for the same purpose as the flats 155 of feed roller 123. Flats 156 enable the card stack 122 to drop sufficiently for the lowermost card to pass through the opening of the card gage 151 when feed roller 152 urges it outward. The intermittent advancement and consequent spacing out of the cards is accomplished by means of an over-running delay clutch. The clutch consists of a projecting tang on the feed gear hub 125 which engages a pin 127 inserted in the feed roller shaft 128, as illustrated in FIG. 1.

The feed gear is not fixed to the feed roller shaft. However, when a card is first being fed, the projecting tang on the feed gear hub rotates the feed roller by contacting the shaft pin. When the card is subsequently engaged by the drive and pressure rollers 38 and 42, it is speeded up because the drive rollers are geared to turn slightly fasten than the feed gear 126. The "speeded-up" card causes the feed roller and its shaft to rotate faster than the feed gear hub 125, resulting in the separation of the hub tang and shaft pin. The feed shaft stops turning when the card is driven off the feed rollers 152, and it remains stationary and feeds no more cards until the projecting tang on the constantly rotating feed gear hub catches up with and re-engages the pin on the feed roller shaft. Such engagement will then cause the feed roller to turn and to feed out the next card.

Figure 4:
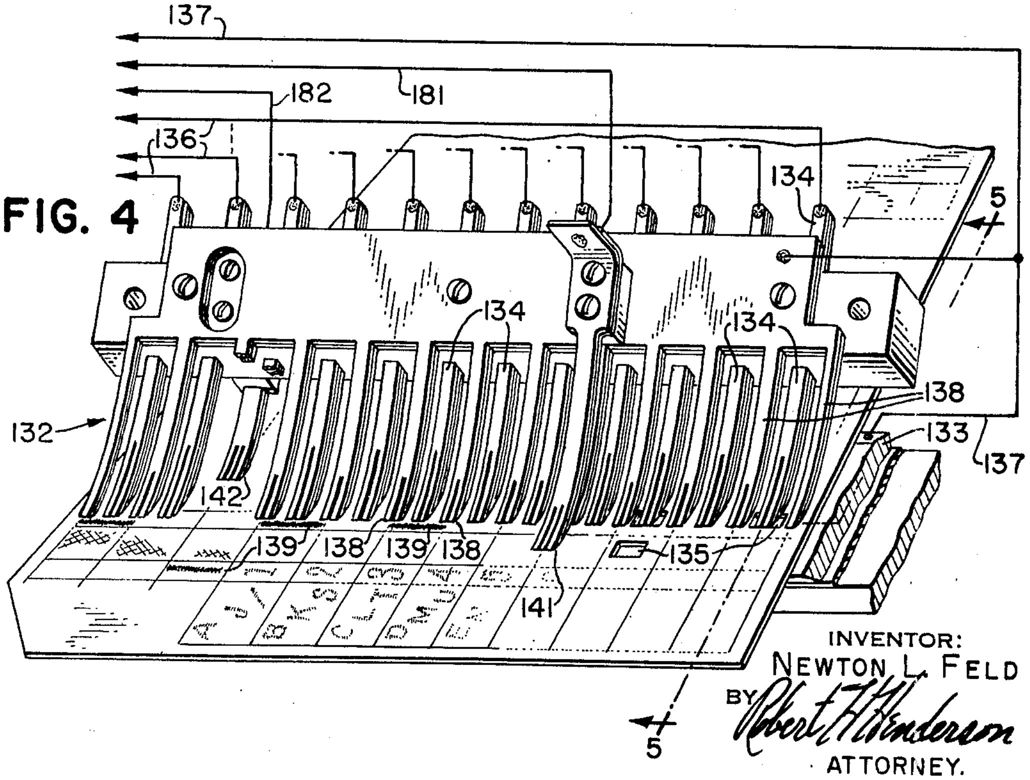
FIG. 4 is an isometric view of a portion of FIG. 1.

After being fed from the card bin, the card is driven under the stylus assembly shown in FIG. 4 and ejected by the drive and pressure rollers into a card basket not shown.

There is a motor brake 131 on the shaft of motor 22 which can stop the feed mechanism on electrical remote command. This brake is energized by external logic circuitry whenever an alpha character follows a numeric character, or vice versa. Stopping the card permits the electronic section to generate a Figures or Letters shift character. After the shift function signal and the subsequently sensed characters are transmitted, the brake is released and the card continues to feed through the unit. The brake may also be energized on Baudot or American Standard Code for Information Interchange code units to permit insertion of external variable data which is not present on the cards 122. In this case, the brake may be released either by an operator or automatically from remote electrical control equipment. Finally, the brake is energized in cases of an alarm condition by external circuitry which responds to the detection of malfunction by the means to be described.

Read head

The stylus assembly, illustrated in FIGURE 4, consists of twelve stylus stations which coincide with the twelve information rows of a Hollerith coded punched card. Cards are driven between the stylus assembly 132 and the terminal block 133 and punched-hole information is read when the intelligence styli such as 143 fall through the holes such as 135 and make contact with the block 133. This completes a circuit through wires such as 136 and wire 137 which allows storage of the character in the electronic logic section connected thereto but not shown.

Each of the twelve intelligence styli assemblies 134 has a pair of battery styli such as 138 straddling it on either side. These battery styli enable the intelligence styli to sense pencil marks 139, since the pencil lead forms a conductive path between them. An electrical pulse through the pencil mark has the same effect on the intelligence styli as an electrical pulse from the terminal block 133, and the sensed character similarly affects the electronic circuitry. The straddling configuration provides two conductive paths from battery to intelligence styli, and greatly increases mark-sensing reliability. Either the battery styli 138 or the intelligence styli assemblies 134 are capable of producing an electrical output reading signal.

Front and rear probe styli 141 and 142 are mounted on the assembly for sensing the front and rear edges of each card to energize wires 181 and 183 respectively. When the rear stylus 142 falls off the card, an "end of card" signal is caused to be generated. In addition, the probes provide signals used to blind the electronic circitry and prevent transmission of false characters before the arrival of column 1 and after the passage of column 80 on the card.

It has been found to be advantageous in order to secure reliable functioning of the styli in the presence of lint and dust which occasionally accumulates on them, to shape the free ends of the styli. This is done in such a manner that they will make optimum electrical contact without having any tearing or scratching effect on the surface of the cards. When using styli formed of beryllium coper sheet in the manner shown, it is convenient to grind the stylus ends to an angle of twenty degrees whereupon mounting them in the configuration shown causes a further deflection of about five degrees and results in satisfactory performance.

Indexing wheel

When transmitting data from cards, it is important that the original card field format be duplicated at the receiving station. Since fields of punched information may be separated by skipped or blank columns on a card, it is necessary to transmit a character for each column on the card, and to identify the skipped columns by transmission of a spacing character. Transmission of the required characters is achieved through generation of appropriate probe pulses by the indexing wheel assembly 143.

This may include a toothed indexing wheel 144, a light source 145 and a photocell 146. The toothed wheel is mounted on a horizontal shaft journalled in a manner to cause the wheel to be carried around by rolling along the underside of a passing data card. The wheel 144 is provided with notches 147 to engage a spring member 148 having an end 149 shaped to fit therein. A small but adequate degree of angular correction thus is performed on the wheel 144 by the end 149 of spring member 148 at any notch position, provided that the wheel is free to rotate due to not being engaged by a passing card at that time. When the wheel is urged into engagement with a passing card by the pressure of card hold down member 153, however, the detent mechanism is ineffective, so that the rotation of wheel 144 and the passage of the teeth thereof are dependent solely on the motion of the card, when a card is present, but are detented to a precise predetermined position upon the completion of any card.

Light from the light source 145 is interrupted in its course to the photocell 146 by the teeth of wheel 144 in the expected manner, and the teeth being of suitable number and spacing, the electrical output of photocell 146 is differentiable into proble pulses or delayed to form gate pulses corresponding to the passage of each character column of the data card, and usable to initiate transmission of a stored character from a storage network. It is particularly to be noted that due to the unusual multiplicity of the spring urged reading brushes employed in order to insure reliability of sense mark reading as heretofore explained, a drag pressure by the brushes on the card being read is used which is very much greater than that heretofore employed in card readers. As a consequence of this, reliance cannot be placed on the card feeding mechanism to advance the card uniformly but by the means disclosed, it is rendered unnecessary to do so, because the rotation of wheel 144 is unaffected by brush drag, and provides gate and probe pulses keyed directly to the columns of the card, regardless of any slippage of the card that may occur.

It is further to be observed that since the indexing of wheel 144 can occur only when there is no card in contact with it, that is, during the three-quarter inch (approximately) interval between cards, it becomes essential in order that the wheel 144 may be properly indexed for every card that such interval be assured by the operation of the device by such card feed means as have been described. Wheel 144 is observed to have teeth indexable in such manner by spring 148 as always to present a vertical tooth wall in a definite predetermined indexing position to every card.

As an alternative structure, a form of indexing wheel 161 of FIG. 3 has been found to operate successfully, the straight knurl 162 on the circumference providing adequate card traction, while the drilled holes 163 produce the desired interruptions of light transmitted from source 145 to photocell 146. Indexing of the wheel is accomplished by the end portion 149A of the spring member 148A which falls into a notch 171 in wheel 161. Since indexing occurs only once per revolution of the wheel 161 with this arrangement, it is limited in practice to the use of cards of a single length, in contrast to the arrangement previously described, which will accommodate cards of any length which can be fitted into the card bin.

What is claimed is:

1. In a data card reader for moving cards, means for producing probe pulses which are coincident with the passage of card data positions, which comprises wheel means contacting the card for being rolled thereupon by frictional engagement therewith, the said wheel means comprising alternate solid portions and apertured portions, aperture sensing means located for responding to the passage of said apertured portions by the production of electrical output signals, and resilient reset means operative to restore said wheel means to a predetermined angular orientation after passage of a card.

2. The device of claim 1 wherein each of said solid portions has a substantially radially disposed surface indexable to a position normal to the plane of an approaching card.

3. The device of claim 1 wherein the said aperture sensing means comprises a switch.

4. The device of claim 1 wherein the said aperture sensing means comprises photoelectric means.

5. The device of claim 1 wherein the said aperture sensing means comprises electromagnetic means.

6. The device of claim 1 wherein the said apertured portions of said wheel means comprises a plurality of transverse openings circumferentially disposed therein.

7. The device of claim 1 wherein the said solid portions of said wheel means comprise that part of the wheel means which surrounds a plurality of transverse openings circumferentially disposed therein.

8. In a device for the extraction of intelligence traces including sense marks, perforation marks, coded storage intelligence preimposed in discrete locations upon a plurality of stacked record sheets and also for intermixing externally stored intelligence material with the said intelligence traces:

a plurality of intelligence trace sensing brushes comprising a plurality of layers of conductive metallic spring sheet material having relatively narrow slits therein in order to form numerous independently downwardly urged contacting means operative at each discrete intelligence trace position;

means for spaced one at a time record sheet advancement intermittently from the stack whereby a spaced-out continuous flow of record sheets is provided;

further brushes for sheet sensing located for detection of spaced-out card interstices;

gating means for the said brush means comprising an apertured rolling member for card engagement to provide rolling therealong and resilient detent means engageable with said rolling member and operable to index said gating means to a predetermined angular orientation only when said gating means is not in engagement with a card; and photoelectric means adjacent said apertures for signal generation upon rolling member rotation;

whereby sense mark and perforation mark and coded storage intelligence are read and intermixed without inaccuracy due to the slippage of record sheets of any length.

9. The device of claim 8 wherein the said record sheets comprise cards.

10. The device of claim 9 wherein the said intelligence traces comprise conductive sense marks.

11. The device of claim 9 wherein the said intelligence traces comprise both conductive sense marks and punched holes.

12. In a card reader for reading from a stack of data cards which are provided with information in the form of sense marks in addition to punched card holes:

card hole and mark sensing brush means frictionally engaging the cards through their travel over a reading zone, and adapted to sense and provide by discrete indication any holes or markings existing on a card in a plurality of predetermined sensing areas;

means for spaced one at a time card advancement intermittently from the stack which comprises a first roller of elastomeric frictional material having at least one flat thereon, mounted on a transversely journalled shaft for card engagement, gear means for rotating the shaft, and intermitting means for the periodic rotation of the said roller by the said gear means, a second and continuously rotating roller for advancing the cards more rapidly than said first roller whereby cards are advanced in spaced-out relationship;

card sensing brushes engaging the card and operable in the spaced-out distance between cards to detect card absence; and gating means for the said brush means comprising a card driven rolling member for card engagement having cut away portions and resilient detent means operable to index said gating means only when said rolling member is not in engagement with a card; and photoelectric means adjacent said cut away portions for probe signal generation upon rolling member rotation.

13. In a device for the extraction of intelligence traces preimposed upon a plurality of stacked record sheets which have a relatively large number of successive character stations as well as of code levels for sensing by spring pressure actuated electrical brushes on a bed plate when the record sheets are drawn under the brushes by a drive roller;

means for spaced, one at a time sheet advancement intermittently from the stack, which comprises at least one sheet contacting sheet feed roller of elastomeric frictional material mounted on a transversely journalled shaft, gear means for rotating the shaft and intermitting means for the periodic rotation of the said roller and shaft by the said gear, said gear and said feed roller having effective diameters such as to urge the card forward less rapidly than the urging by said drive roller;

a plurality of intelligence trace sensing brushes located over a bed plate and comprising a plurality of layers of conductive spring sheet material having relatively narrow slits therein to form numerous independently downwardly urged bed plate contacting means operative for each intelligence trace position;

sheet sensing brushes located for sensing the presence of a sheet in a reading position by contact with said bed plate; and round probe pulse generating means comprising a rotatable member mounted for card contact on the circumference thereof and having a rolling surface adapted for tractive engagement by the card without substantial slippage thereon, aperture means in said member for light beam interruption at predetermined angles of rotation, and light source means and photocell means mounted for modulation by said aperture means to produce an electrical output signal for each said predetermined angle.

14. In a device for reading both alpha and numeric information contained on a data card which has a relatively large number of successive character stations as well as of code levels for sensing by spring pressure actuated electrical brushes when the card is driven forward by a drive roller actuated by a motor;

unitary card hole and mark sensing brush means frictionally engaging the cards throughout their travel over a reading zone, and adapted to sense and to provide by discrete electrical indication any of either holes or sense markings existing on a card in any of a plurality of predetermined sensing areas;

intermitting means for spaced one at a time card advancement from the stack which comprises a card contacting card feed roller of frictional material mounted on a transversely journalled shaft, means for rotating the shaft and means for causing periodic advancement of the card by the said roller;

card drive roller means operable on cards advanced by the said feed roller to forward them continuously in spaced-out relationship;

probe pulse generating means comprising a rotatable member mounted for card contact and having a rolling surface adapted for tractive engagement to be driven by the card without substantial slippage thereon, cut away portions in said member for light beam transmission at predetermined angles of rotation, and light source means and photocell means mounted for producing modulation of a light beam by said cut away portions to generate an electrical output signal for each said predetermined angle;

card sensing brushes located immediately behind and ahead of said reading zone, operative in said interstices to detect card absence; and brake means on said motor for stopping said drive roller and said feed roller upon detection of predetermined function signals by said brush means.

References Cited

UNITED STATES PATENTS

| | | | |
|---|---|---|---|
| 2,931,689 | 4/1960 | Dupy. | |
| 3,184,581 | 5/1965 | Willoughby. | |
| 3,225,176 | 12/1965 | Jones | 235—61.115 |
| 3,350,545 | 10/1967 | Street | 235—61.115 |

FOREIGN PATENTS

| | | |
|---|---|---|
| 800,439 | 8/1958 | Great Britain. |

RALPH G. NILSON, Primary Examiner

C. M. LEEDOM, Assistant Examiner

U.S. Cl. X.R.

235—61.111, 61.115; 250—233; 340—174.1